US012206816B2

(12) United States Patent
Ringberg et al.

(10) Patent No.: US 12,206,816 B2
(45) Date of Patent: Jan. 21, 2025

(54) METHOD AND APPARATUS FOR SERVICE CHARGING IN A COMMUNICATION NETWORK

(71) Applicant: Telefonaktiebolaget LM Ericsson (publ), Stockholm (SE)

(72) Inventors: Björn Ringberg, Rödeby (SE); Peter Skarphagen, Lyckeby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 394 days.

(21) Appl. No.: 17/785,457

(22) PCT Filed: Dec. 16, 2019

(86) PCT No.: PCT/SE2019/051287
§ 371 (c)(1),
(2) Date: Jun. 15, 2022

(87) PCT Pub. No.: WO2021/126021
PCT Pub. Date: Jun. 24, 2021

(65) Prior Publication Data
US 2023/0013156 A1    Jan. 19, 2023

(51) Int. Cl.
*H04M 15/00* (2024.01)
*H04M 17/00* (2024.01)
*H04W 4/24* (2024.01)

(52) U.S. Cl.
CPC ......... *H04M 15/785* (2013.01); *H04M 15/80* (2013.01); *H04M 15/854* (2013.01); *H04W 4/24* (2013.01)

(58) Field of Classification Search
CPC .. H04M 15/785; H04M 15/80; H04M 15/854; H04W 4/24
See application file for complete search history.

(56) References Cited

U.S. PATENT DOCUMENTS

2006/0034438 A1\* 2/2006 O'Neill ................. H04L 47/83
                                                       379/114.07
2009/0319412 A1\* 12/2009 Karlsson ........... H04M 15/8228
                                                             705/35

(Continued)

FOREIGN PATENT DOCUMENTS

EP          3203714 A1    8/2017
WO      2014125102 A1    8/2014

(Continued)

OTHER PUBLICATIONS

IP.com search (Year: 2024).\*

(Continued)

*Primary Examiner* — Moustapha Diaby
(74) *Attorney, Agent, or Firm* — Murphy, Bilak & Homiller, PLLC

(57) ABSTRACT

Charging interval authorizations according to the techniques disclosed herein provide for credit reservation and charging of whole charging intervals across two or more credit containers (36) in or linked to a subscriber account (34), without the need for redefining the charging interval size, even where the types of credit units differ between or among the credit containers (36) used to authorize the charging interval. Among the various advantages, the disclosed techniques preserve the original charging interval size, which may be defined for reasons of signaling efficiency, while simultaneously allowing the reservation or consumption of credit units from credit containers (36) having insufficient remaining credit for authorization of the full charging interval.

20 Claims, 6 Drawing Sheets

(56) References Cited

U.S. PATENT DOCUMENTS

| | | | | |
|---|---|---|---|---|
| 2013/0117092 | A1* | 5/2013 | Cai | H04M 15/85 |
| | | | | 705/14.31 |
| 2014/0348030 | A1* | 11/2014 | Tornkvist | H04M 15/60 |
| | | | | 370/259 |
| 2015/0087260 | A1* | 3/2015 | Lowenadler | G06Q 20/123 |
| | | | | 455/406 |
| 2022/0022011 | A1* | 1/2022 | Bhatnagar | H04M 15/78 |

FOREIGN PATENT DOCUMENTS

| | | | |
|---|---|---|---|
| WO | 2019015750 | A1 | 1/2019 |
| WO | 2019095725 | A1 | 5/2019 |
| WO | 2019120531 | A1 | 6/2019 |

OTHER PUBLICATIONS

"3rd Generation Partnership Project; Technical Specification Group Service and System Aspects; Telecommunication management; Charging management; Diameter charging applications (Release 8)", 3GPP TS 32.299 V8.9.0, Dec. 2009, 142 pages.

"3rd Generation Partnership Project; Technical Specification Group Services and System Aspects; Telecommunication management; Charging management; Charging architecture and principles (Release 16)", 3GPP TS 32.240 V16.0.0, Mar. 2019, 61 pages.

"3rd Generation Partnership Project; Technical Specification Group Services and System Aspects; Telecommunication management; Charging management; Diameter charging applications (Release 15)", 3GPP TS 32.299 V15.0.0, Sep. 2017, 199 pages.

"Digital Cellular Telecommunications System (Phase 2+) (GSM); Universal Mobile Telecommunications System (UMTS); LTE; Telecommunication management; Online Charging System (OCS): Applications and interfaces", ETSI TS 132 296 V15.0.0 (3GPP TS 32.296 version 15.0.0 Release 15), Jul. 2018, 95 pages.

* cited by examiner

METHOD AND APPARATUS FOR SERVICE CHARGING IN A COMMUNICATION NETWORK

TECHNICAL FIELD

The present invention relates to charging for communication services in a communication network.

BACKGROUND

Charging for the use of communication services provided through telecommunications communication networks may be based on offline charging, where the charging information does not have a real-time effect on the communication service being rendered, or online charging, where the charging information may have a real-time effect on the service rendered. Online charging, therefore, involves communication session/service control. Relevant example details related to DIAMETER-based charging in Third Generation Partnership Project (3GPP) networks, such as GSM/UMTS/EPS networks, appear in the 3GPP Technical Specification (TS) 32.299 V15.0.0 (2017-09-21). Additional example details regarding online charging appear in WO2019/120531, as published on 2019 Jun. 27.

In an example scenario, a subscriber is a person or entity having one or more user devices—broadly referred to as User Equipments or UEs—that are authorized or otherwise credentialed to access a home telecommunication network provided by a network operator, either directly or through a visited telecommunication network. A subscriber account associated with the subscriber holds credit used for authorizing communication service usage by a user device linked to the subscriber account. In a representative session-based charging scenario, an initial attempt to access the involved communication service by a UE triggers an initial credit request, where authorization of the requested initial consumption depends on sufficient credit being available in the subscriber account. Subsequent requests for continued use of communication service during the same session trigger similar additional credit requests, with the authorization of each subsequent credit request dependent on the availability of sufficient remaining credit.

Continuing the example scenario, a Charging Trigger Function (CTF) or similar entity in the communication network triggers each credit request, with each request requesting authorization for one or more charging intervals. The charging interval depends on the nature of the involved communication service and it may be expressed in time units such as minutes, volume units such as megabytes, etc. Generally, however, the network operator configures the size of the charging interval on a system-wide or global level, according to various considerations. Authorization of each requested charging interval requires that sufficient credit be available in or through the subscriber account.

Each charging interval defines, according to a charging configuration used in the communication network for the involved communication service, a number of service units. Each service unit is a quantum of metered consumption of the communication service and may be understood as the smallest chargeable interval of consumption, expressed in the unit of measure used to meter consumption of the communication service. Voice service may be metered in integer minutes, for example, and data services may be metered in integer megabytes, as another example.

Authorization of a charging interval depends on sufficient credit being available in or through the subscriber account linked to the UE involved in the credit request. To that end, the subscriber account may contain or be linked to one or more credit containers, with each credit container serving a repository for credit units, for use in authorizing consumption of one or more types of communication services. Some credit containers may be specific to a particular type or family of services. For example, a credit container that contains credit units expressed in minutes may be usable only for voice services that are metered in minutes, or a credit container that contains credit units expressed in megabytes may be usable only for communication services that are metered in megabytes.

However, other credit containers may be usable for multiple types of communication services. For example, a credit container may contain promotional or bonus points, where the individual points translate into corresponding quanta of metered service consumption, such as two points per minute of voice service consumption, or two points per megabyte of data service consumption. As another example, a credit container may contain monetary credit usable for authorizing consumption of essentially any type of communication service. In practice, then, a credit container may be regarded as a type of exhaustible stored value object that contains a certain amount of credit—a certain number of credit units—against which one or more types of communication-service usage may be reserved and, ultimately, debited (charged).

Credit containers may be associated with or represent product offerings, such as where the network operator or a business affiliate allows subscribers to purchase a certain amount of service consumption in advance, such as by buying a certain number of minutes of voice service or a certain volume of data usage in advance. Purchase of a product offering by a subscriber results in the provisioning of a credit container that is chargeable in association with consumption of the involved produce—communication service—by user devices linked to the subscriber account.

Credit containers also may be single use or replenishable. As a single-use example, a network operator or a business affiliate credits the account of a subscriber with a number of bonus or loyalty points that translate into a corresponding amount of service usage, for one or more types of communication services. Any given credit container also may have an associated validity period or an associated expiration date. For example, bonus points may be good only during a defined interval or may be usable only at certain times, such as off-peak hours. Other possible complexities include various qualifiers that define or affect the rating parameters used to determine the per service unit cost expressed in the unit of measure used by the credit units being rated for reservation/charging.

As a consequence of such complexities, a known approach to charging uses one of two techniques to avoid using credit units from more than one container to authorize a requested charging interval. According to one technique, if a selected credit container does not contain sufficient credit to authorize the requested charging interval, the requested charging interval is dynamically divided, effectively defining new, smaller charging intervals that can be authorized individually, as a whole, using respectively selected credit containers.

The other technique avoids redefining the charging interval size, which can increase signaling overhead in the network, but does so at the expense of charging flexibility. Namely, the requested charging interval is authorized only if there is a single credit container that contains sufficient available credit for authorizing the entire charging interval. Thus, credit units in a credit container that are otherwise available for authorizing a requested communication service may go unused if they are not sufficient to authorize the entire charging interval.

SUMMARY

Charging interval authorizations according to the techniques disclosed herein provide for credit reservation and charging of whole charging intervals across two or more credit containers in or linked to a subscriber account, without the need for redefining the charging interval size, even where the types of credit units differ between or among the credit containers used to authorize the charging interval. Among the various advantages, the disclosed techniques preserve the original charging interval size, which may be defined for reasons of signaling efficiency, while simultaneously allowing the reservation or consumption of credit units from credit containers having insufficient remaining credit for authorization of the full charging interval.

An example method of operation performed by a node of a charging system associated with a communication network includes receiving a credit request for authorizing use of a communication service in the communication network by a user device associated with a user account. The credit request requests reservation of a first number of service units corresponding to one or more charging intervals. Each charging interval defines, according to a charging configuration used in the communication network for the communication service, a second number of service units. Each service unit is a quantum of metered consumption of the communication service.

The method further includes the node authorizing the one or more charging intervals in dependence on sufficient credit units being available for reservation among multiple credit containers associated with the user account. Such operations include authorizing each of at least one of the one or more charging intervals by reserving a corresponding aggregation of credit units from two or more credit containers among the multiple credit containers. Here, a respective number of credit units reserved from each of the two or more credit containers for the aggregation of credit units depends on a type-dependent rating function that translates between the service units and the type of credit units contained in the credit container. Further, the method includes the node sending a credit response indicating a total number of service units corresponding to the authorized charging intervals.

An example node is configured for operation in a charging system associated with a communication network and includes communication interface circuitry and processing circuitry that is operatively associated with the communication circuitry. The communication interface circuitry is configured to send messages to and receive messages from one or more other nodes in the charging system or the communication network.

The processing circuitry is configured to receive a credit request for authorizing use of a communication service in the communication network by a user device associated with a user account. The credit request requests reservation of a first number of service units corresponding to one or more charging intervals, where each charging interval defines, according to a charging configuration used in the communication network for the communication service, a second number of service units. Each service unit represents a quantum of metered consumption of the communication service.

Further, the processing circuitry is configured to authorize the one or more charging intervals in dependence on sufficient credit units being available for reservation among multiple credit containers associated with the user account, including authorizing each of at least one of the one or more charging intervals by reserving a corresponding aggregation of credit units from two or more credit containers among the multiple credit containers. Here, a respective number of credit units reserved from each of the two or more credit containers for the aggregation of credit units depends on a type-dependent rating function that translates between the service units and the type of credit units contained in the credit container, and the processing circuitry is configured to send a credit response indicating a total number of service units corresponding to the authorized charging intervals.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
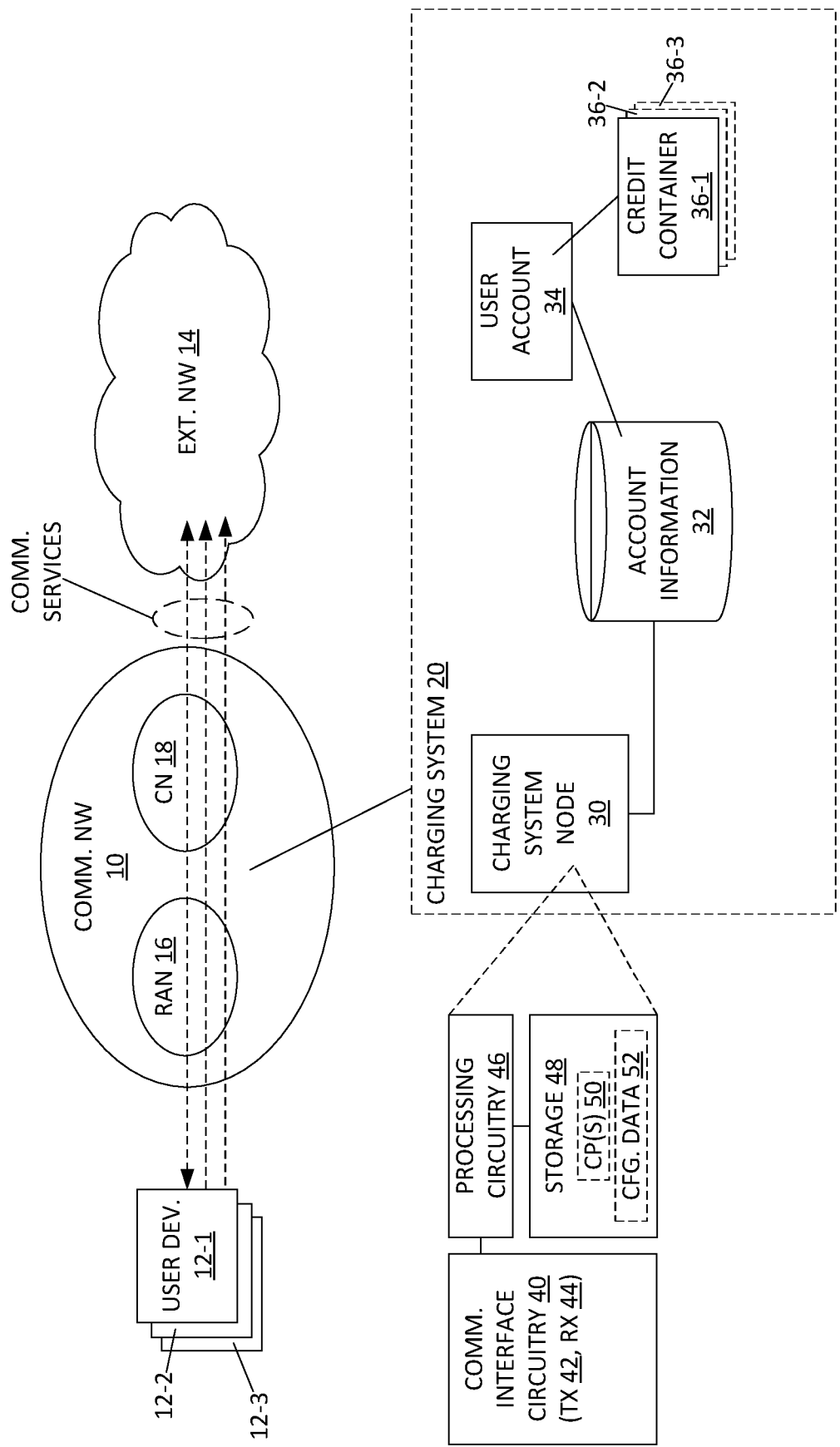
FIG. 1 is a block diagram of one embodiment of a charging system node and an associated charging system included in or associated with a communication network.

FIG. 1 illustrates an example communication network 10 through which communication devices 12 access one or more communication services, such as may be available from servers, systems, or other devices accessible via the Internet or another external network 14. In the example case, the communication network 10 is a wireless communication network that includes a Radio Access Network (RAN) 16 that provides an air interface for communicatively coupling to the communication devices 12, which, in this particular example, include radio transceiver circuitry configured for communicating with the RAN 16, according to the applicable radio signal types, structure, timing, and protocols.

As a non-limiting example, the communication network 10 operates according to specifications promulgated by the Third Generation Partnership Project (3GGP), such as the specifications defining so-called Fourth Generation (4G) networks, referred to as Long Term Evolution (LTE) network. In that example, the RAN 16 is an Evolved Universal Terrestrial RAN (E-UTRAN) and its associated Core Network (CN) 18 may be an Evolved Packet Core (EPC). In another example, the communication network 10 operates according to the Fifth Generation (5G) specifications and the RAN 16 provides a New Radio (NR) interface.

Both in and apart from the 3GPP-based examples, the communication devices 12 also may be referred to as User Equipments (UEs) 12 or user devices 12, to denote the fact that they use communication services provided by or through the communication network 10 but are not regarded as belonging to the supporting network infrastructure. While three user devices 12-1, 12-2, and 12-3 appear in the diagram for example purposes, no limitation attends the example count, and the reference number "12" is used herein to refer to communication devices in the singular and plural senses and the suffixing is omitted where not needed for clarity.

Broadly, the terms "communication device", "user device", and "UE" denote any 3GPP or non-3GPP communication apparatus that is configured to use one or more types of communications services based on accessing the communication network 10, e.g., subject to authentication and accounting control associated with a user account. Non-limiting examples include smartphones and mobile computing devices associated with human users, along with network adaptors, computers, etc., which may or may not be associated with human users. Further included are any of the various Machine Type Communication (MTC) or Internet-of-Things (IoT) devices that often do not involve any human use or interaction, and instead support various machine-based operations, such as monitoring and control.

Moreover, the particulars of the communication network 10 and the user devices 12 that access it are not necessarily relevant to the charging operations of primary interest in this disclosure. For an example framework for those charging operations, FIG. 1 illustrates a charging system 20, which provides online charging in one or more example embodiments. "Online charging" denotes charging for communication-service use in real time, such as where the initiation or continuation of a call or other type of communication session requires that sufficient credit be available for reservation and charging. See ETSI TS 132 296 V15.0.0 (2018-07), for example details regarding online charging.

The charging system 20 includes one or more charging system nodes, with an example charging system node 30 depicted. The charging system node 30 contains or has access to account information 32 regarding subscriber accounts, also referred to as user accounts. One user account 34 appears for discussion purposes and in an example scenario, one or more user devices 12 are linked to the user account 34 and use one or more types of communication services via accessing the communication network 10, in dependence on the availability of sufficient monetary or non-monetary credit for reservation and debiting.

By way of example, the user account 34 contains or links to one or more credit containers 36, with three credit containers 36-1, 36-2, and 36-3 shown for discussion purposes. The user account 34 may include or be linked to multiple credit containers 36, where two or more of the credit containers 36 may hold different types of credit units. Here, the "type" of credit unit refers to the denomination or unit of measure used to define the credit held in the credit container 36. For example, the credit units held in any given credit container 36 may be points, or minutes, or megabytes, or some other non-monetary unit of measure, or may be a monetary unit of measure, such as Euros or U.S. Dollars.

Some types of credit units may be restricted to a certain type of communication service, while other types, such as monetary credit, may be used for authorizing essentially any type of chargeable communication event, such as a communication session initiation or continuation. Correspondingly, a rating function (which may comprise multiple functions or may comprise a parameterized function for adaptability) translates or converts between the service units to be authorized and the credit units to be reserved or consumed for the authorization. In some instances, the credit units and the service units may use the same unit of measure, e.g., data volume, but they may not have the same size or resolution.

Further, given credit units in a given credit container 36 may have an expiration date or validity dates and the rating parameters applied for converting between the service units being rated and the credit units used for the rating may include time-of-day, location, and/or other parameters that dynamically affect the rating. Credit containers 36 may be single-use or may be replenishable and in either case may be regarded as a stored value object, data record, or other data structure that defines or represents credit units for authorization of corresponding consumption of a communication service.

Generally, the charging system node 30 stores or otherwise has access to the account information 32, within information about any number of user accounts 34 and the credit container(s) 36 included in them or linked to them. The account information 32 may or may not be centralized and different portions of the account information 32 may be maintained by different computer servers. For example, the account information 32 belongs to a centralized or decentralized database of account information for a plurality of subscribers, where each subscriber is a person or other entity having a standing or temporary usage agreement in place with the operator of the communication network 10 or with another operator in a roaming agreement with the operator of the communication network 10. Similarly, the charging system node 30 may be one node—e.g., one computer server—or may comprise multiple nodes, e.g., distributed at different locations in the charging system 20.

As used herein, the term "node" refers to processing and communication interface circuitry operative to provide one or more functions within a network or system of nodes. Computer servers are, therefore, a non-limiting example of a "node" within the meaning intended herein. Of course, nodes may be virtualized in data-center or cloud-computing implementations, but even nodes instantiated using software-based virtualization include, at bottom, physical circuitry for computation and communications. Thus, whether implemented as a single node or implemented in a distributed arrangement, the contemplated charging system node 30 includes communication interface circuitry 40 for communicating with other nodes in or external to the charging system 20. In a non-limiting example, the communication interface circuitry 40 includes one or more transmitter circuits 42 and one or more receiver circuits 44 that implement wired or wireless physical interfaces, for sending and receiving charging-related signaling, such as requests for credit authorization and return responses. The communication interface circuitry 40 in at least one embodiment includes the physical-layer interface circuits, along with one or more protocol processors, timing circuits, etc., for implementing the involved communication protocols and signaling.

Further included in the charging system node 30 is processing circuitry 46, which may or may not use "virtualization" which involves the instantiation of virtualized processing resources using underlying processing hardware, as coordinated by the involved operating system and virtualization software. Even with virtualization, the processing circuitry 46 comprises physical circuitry that is fixed or programmed or some combination of fixed circuitry and programmed circuitry.

In one or more embodiments, the processing circuitry 46 comprises one or more microprocessors, digital signal processors (DSPs), field programmable gate arrays (FGPAs), complex programmable logic devices (CPLDs), or application-specific integrated circuits (ASICs), or any combination thereof. Further, in at least one such embodiment, the processing circuitry 46 is configured, at least in part, based on its execution of stored computer-program instructions. For example, the storage 48 stores one or more computer programs (CP(s)) 50 comprising program instructions for execution by one or more microprocessors or other type of computer processor used to form the processing circuitry 46. The storage 48, which comprises one or more types of computer-readable media, such as memory circuits and/or disk storage, also may store various items of configuration data (CFG. DATA) 53. Example configuration data, which may be provisioned within or temporarily stored in the storage 48, includes information about charging-interval sizes for charging different types of communication services, rating data for determining the price or cost of service units, etc.

Keeping in mind the above points of flexibility and variation, the contemplated charging system node 30 is for operation in an Online Charging System (OCS) associated with a communication network, such as the charging system 20 in relation to the communication network 10. The charging system node 30 includes communication interface circuitry 40 comprising a wired or wireless communication interface for exchanging charging-related messages with one or more other nodes in the charging system 20 or the communication network 10. Further, the charging system node 30 includes processing circuitry 46 that is operatively associated with the communication interface circuitry 40. In at least one example case, referring to the processing circuitry 46 as being operatively associated with the communication interface circuitry 40 means that the processing circuitry 46 is arranged or otherwise configured to send and receive messages or other signaling, possibly of various types and involving more than one protocol, via the communication interface circuitry 40.

In an example embodiment, the processing circuitry 46 is configured to receive a credit request for authorizing use of a communication service in the communication network 10 by a user device 12 associated with a user account 34. The credit request requests reservation of a first number of service units corresponding to one or more charging intervals, each charging interval defining, according to a charging configuration used in the communication network for the communication service, a second number of service units, with each service unit being a quantum of metered consumption of the communication service. Here, "first" and "second" are labels used for clarity and it should be understood that the number of service units requested for rating (authorizing) may be greater than or less than the number of service units spanned by a single charging interval, where the network operator generally defines the size of the charging interval based on balancing practical interests. While smaller charging intervals are more likely to be authorized—as fewer credit units need be available—smaller charging intervals also increase the rate or number of credit requests needed in general, as compared to using a larger size for the charging interval.

The processing circuitry 46 is configured to authorize the one or more charging intervals in dependence on sufficient credit units being available for reservation among multiple credit containers 36 associated with the user account, including authorizing each of at least one of the one or more charging intervals by reserving a corresponding aggregation of credit units from two or more credit containers 36 among the multiple credit containers 36. Here, a respective number of credit units reserved from each of the two or more credit containers 36 for the aggregation of credit units depends on a type-dependent rating function that translates between the service units and the type of credit units contained in the credit container 36. Further, the processing circuitry 46 is configured to send a credit response indicating a total number of service units corresponding to the authorized charging intervals. Of course, in cases where the processing circuitry 46 is configured not to allow authorization of anything less than whole charging intervals, the credit response will indicate that no charging intervals are authorized, in cases where the aggregate credit available across the multiple credit containers 36 is not sufficient to authorize at least one charging interval.

In an example of the above processing configuration, the charging system node 30 receives a request to authorize a certain number of service units associated with providing a certain amount of communication service to a user device 12 that is associated with a user account 34. Subject to the availability of sufficient credit for the user account 34, the charging system node 30 rates and fills as many whole charging intervals as are necessary to authorize the requested number of service units. To the extent that a single one of the multiple credit containers 36 that are linked to the user account 34 contains a number of credit units sufficient to authorize all of the needed number of charging intervals, the charging system node 30 does not necessarily have to use an aggregation of credit units from two or more credit containers 36, but the techniques herein allow for such aggregation even when the involved credit containers 36 do not hold the same type of credit units. Such capability allows prioritization of credit-container selection and allows the selection and use of credit containers 36 that do not contain sufficient credit for authorizing a whole charging interval.

Thus, in one or more embodiments, the aggregation of credit units from the two or more credit containers 36 comprises credit units of different types. Correspondingly, the type-dependent rating function accounts for the type of credit unit in each credit container 36 involved in the aggregation of credit units. Such operation allows and preserves the use of charging intervals that are globally associated with the communication service being rated, according to the applicable charging configuration, e.g., as defined by the network operator.

The type of credit units associated with each credit container 36 among the multiple credit containers 36 may be any one of a monetary amount, a time duration, or a unitless quantum of metered consumption of the communication service.

The processing circuitry 46 in one or more embodiments is configured to identify the multiple credit containers 36 as being chargeable for the communication service, based on determining which communication service products and associated credit containers are chargeable for use of the communication service. Here, a "communication service product" refers to a type of communication service, such as voice service or data service, and earlier details herein noted that certain types of credit units and/or certain credit containers 36 may be chargeable only for certain communication services or certain types of communication services. When attempting a service authorization, the processing circuitry 46 in such embodiments is configured to identify which credit containers 36 are candidates for being used in making the authorization.

For authorizing any given charging interval based on an aggregation of credit units from two or more credit containers 36, the processing circuitry 46 is configured to reserve a first number of credit units from a currently-selected one of the multiple credit containers 36, for authorizing a first fraction of the second number of service units defined by charging interval, and reserve a second number of credit units from a next-selected one of the multiple credit containers 36, for authorizing a second fraction of the second number of service units defined by the charging interval. For example, the first number of credit units is a remaining number of credit units in the currently-selected credit container 36, such that the aggregated reservation exhausts the currently-selected credit container 36, and the processing circuitry 46 is configured to determine the first and second fractions of the second number of service units defined by the charging interval according to the type-dependent rating function as applied respectively to the currently-selected and next-selected credit containers.

Further, in one or more embodiments, the currently-selected and next-selected credit containers 36 are first and second credit containers 36-1 and 36-2 that have different selection priorities. Correspondingly, the processing circuitry 46 is configured to select, as the currently-selected credit container 36, the first credit container 36-1 in preference to the second credit container 36-2, in response to determining that the first credit container 36-1 has a higher selection priority than the second credit container 36-2. In at least one such embodiment, the processing circuitry 46 is configured to determine the priorities from configuration information stored or received by the charging system node 30.

For each charging interval that is authorized by reserving the corresponding aggregation of credit units from two or more credit containers 36 among the multiple credit containers 36, the processing circuitry 46 is configured to reserve corresponding credit units from each of the two or more credit containers 36 by applying the type-based rating function to the credit units in each credit container 36, using rating data to determine a per service unit of cost expressed in the unit of measure used by the credit units being rated. Also, as noted earlier, the type-based rating function is, in one or more embodiments, also a container-based rating function, such that different ratings are applied in dependence on which credit container 36 the credit units being rated belong to, and in dependence on the type of the credit units being rated.

Figure 2:
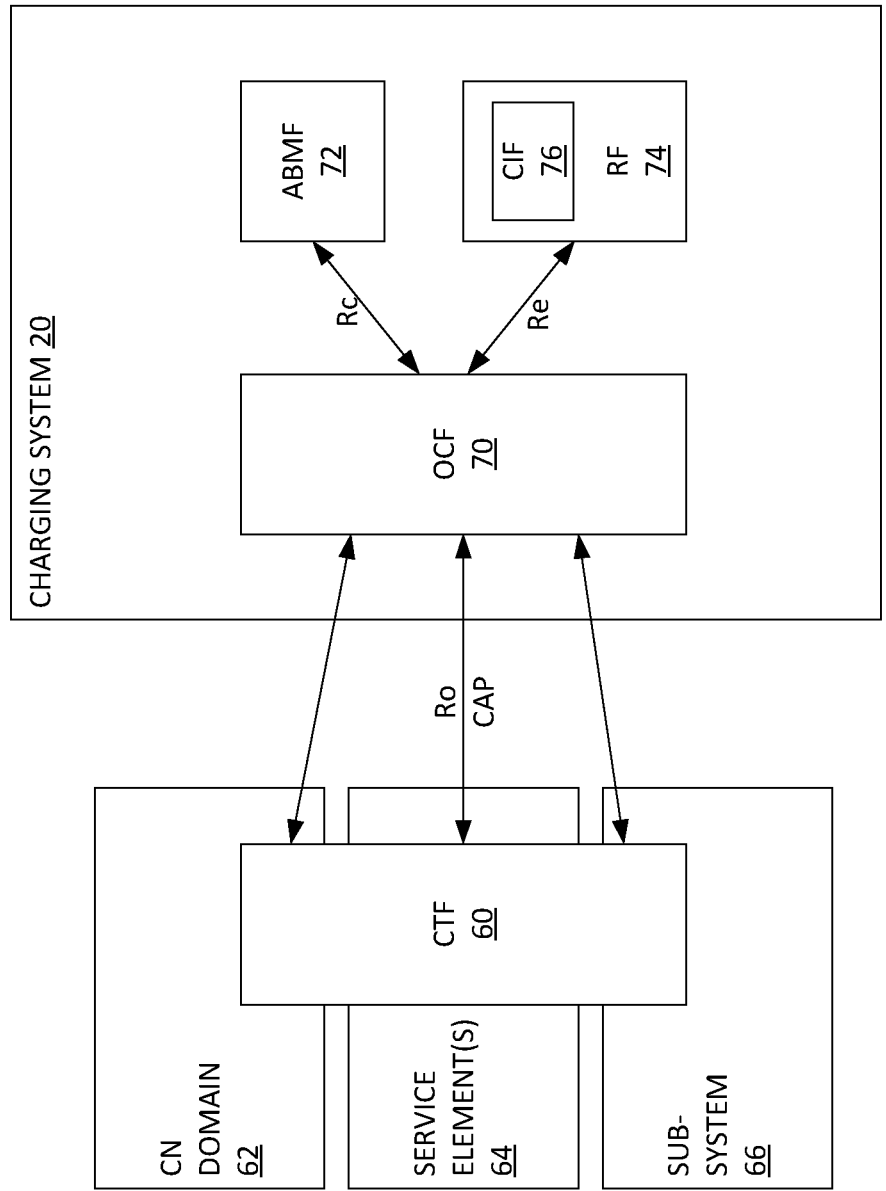
FIG. 2 is a block diagram of example details for the charging system of FIG. 1.

FIG. 2 illustrates an example implementation of the charging system 20 with interfaces to the communication network 10. As for detecting communication-service usage or attempts at usage authorization, the communication network 10 in an example embodiment comprises one or more Core Network (CN) domains 62 (e.g., an Evolved Packet Core or EPC), one or more service elements 64 (e.g., to provide Multimedia Services), and one or more subsystems 66 (e.g., an IP Multimedia Subsystem). These various entities have associated Charging Trigger Functions (CTFs) 60 as integrated components, for collecting information pertaining to chargeable events and sending charging events for user devices 12 that are linked to user accounts 34. Correspondingly, the charging system node 30 may receive signaling from the CTFs 60, or signaling corresponding thereto, e.g., via one or more Online Charging Functions (OCFs) 70.

The charging system 20 further includes, in the example illustration, an account balance management function (ABMF) 72, a rating function (RF) 74, and a charging interrogation function (CIF) 76 that is associated with the RF 74. Here, the word "function" denotes functionality instantiated in a networked computer server or in other processing circuitry. In at least one example, the contemplated charging system node 30 operates as the RF 74 and/or as the CIF 76 associated therewith.

Though the functional requirements for charging are broadly consistent across the various domains, services and subsystems, the reference point(s) between the CTF 60 and the OCF 70 depends on the domain, service, or subsystem involved in detecting communication-service usage. For example, a Circuit Switched (CS) domain uses CAMEL (Customized Applications for Mobile networks Enhanced Logic) as a reference point, whereas an IP Multimedia Subsystem (IMS) uses "Ro" as reference point between the CTFs 60 and the OCF 70. With regard to Diameter Charging Control (DCC), see IETF RFC 4006 and 3GPP TS 32.299 V8.9.0 (2009-12), the latter of which describes standardized interfaces between CTFs 60 and the OCF 70. Such interfaces may be used to "carry" charging-related signaling between the CTFs 60 and OCF 70. For further details regarding example charging architectures and principles associated with operation and interfacing of the CTFs 60, OCF 70, and the charging system node in general, see 3GPP TS 32.240 V16.0.0 (2019-03).

Figure 3:
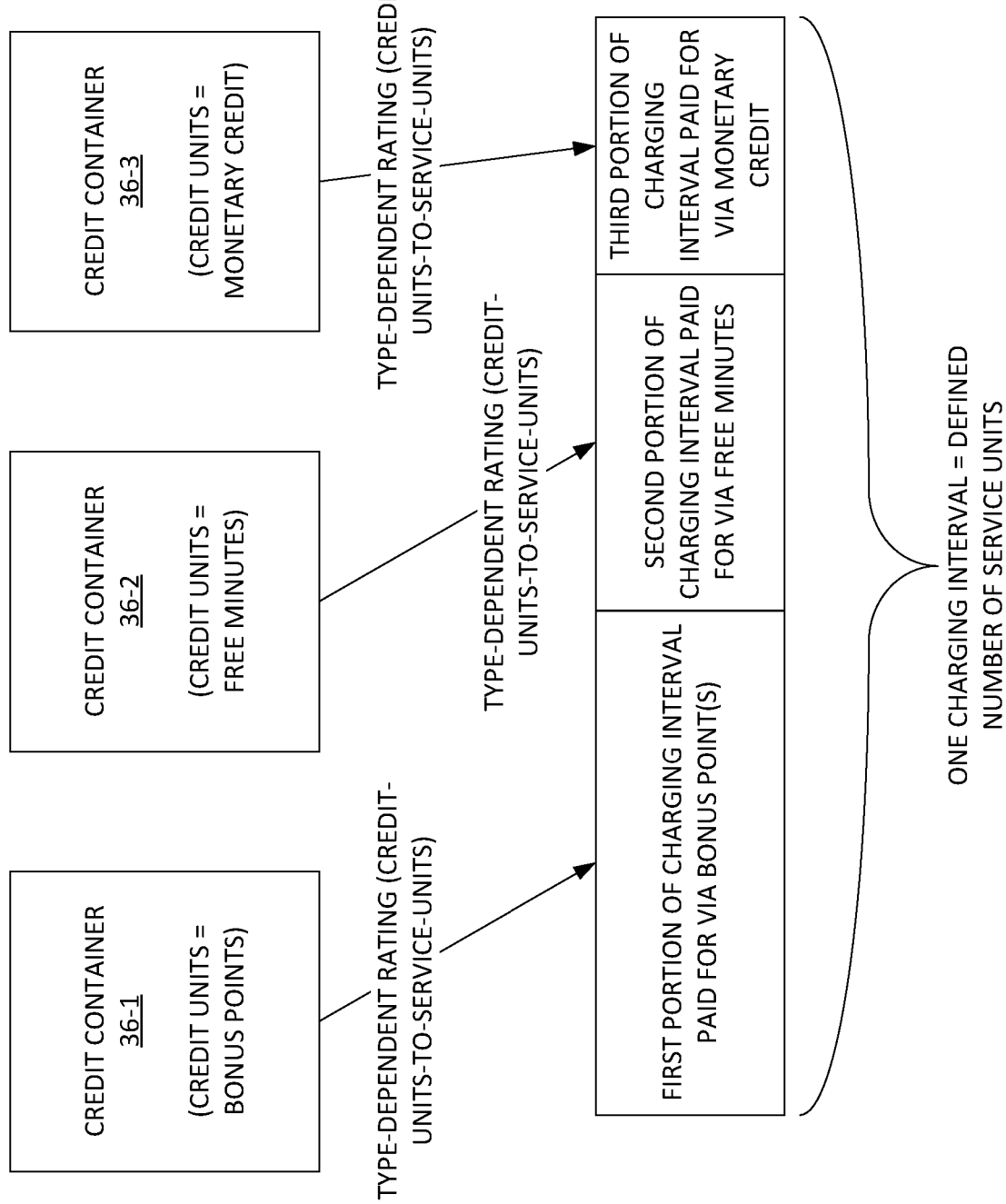
FIG. 3 is a diagram of one embodiment of authorizing a charging interval using multi-container credit reservations.

FIG. 3 provides an example of filling a charging interval using an aggregation of credit units across three different credit containers 36-1, 36-2, and 36-3, involving three different types of credit units. "Filling" a charging interval means rating or authorizing a number of service units equal in number to the defined number of service units contained in one charging interval. Correspondingly, "rating" a service unit means determining its cost in terms of the credit units being reserved.

A first portion of the charging interval is "paid" for via bonus points contained, as a first type of credit units, in the first credit container 36-1. A second portion of the charging interval is "paid" for via free minutes contained, as a second type of credit units, in the second credit container 36-2. A third, remaining portion of the charging interval is "paid" for via monetary credit contained, as a third type of credit units, in the third credit container 36-3. Here, the term "paid" connotes at least a reservation of the involved credit units and may connote the actual debiting of credit units.

The processing circuitry 46 of the involved charging system node 30 determines the conversion or ratio of credit units to service units or vice versa based on a type-dependent rating function, which may be parameterized to account for one or more rating variables. Examples of rating variables include time of day, location, promotional factors, network loading, subscriber agreement, etc. References to the "rating function" may refer to a single function that is parameterized or otherwise adapted for use across multiple credit containers 36, accounting for multiple types of credit units, or may refer to a set of rating functions, each one tailored to a particular credit container 36 and/or a particular type of credit unit. Of course, the rating function used may also depend directly on the involved communication service or type of communication service.

Implied in the illustration is the fact that the credit containers 36-1 and 36-2 do not contain sufficient available credit for rating the entire charging interval, when considered individually and collectively. That is, upon exhausting the available credit in the credit container 36-1, processing advances to the credit container 36-2, and upon exhausting the available credit in the credit container 36-2, processing advances to the credit container 36-3. In at least one embodiment, the order in which the credit containers 36 are selected depends on configuration information that defines the priorities of the credit containers 36. For example, the network operator or a business affiliate may prefer the use of bonus points over free minutes and may prefer the use of free minutes over monetary credit. Such preferences may be driven by validity periods, e.g., where the bonus points and/or free minutes have certain validity periods or expiration dates. Of course, there may be additional or alternative bases for defining the relative priorities between the multiple credit containers 36.

Further, while FIG. 3 depicts three credit containers 36-1, 36-2, 36-3 as being used for authorizing the charging interval, the involved user account 34 may be linked to a larger number of credit containers 36, but it may be that only a subset of that larger number of credit containers 36 is a candidate for use when authorizing a particular communication service or type of communication service. Correspondingly, the processing circuitry 46 of the charging system node 30 in one or more embodiments is configured to determine or otherwise identify the particular credit containers 36 that are candidates for use in any given authorization event.

Figure 4:
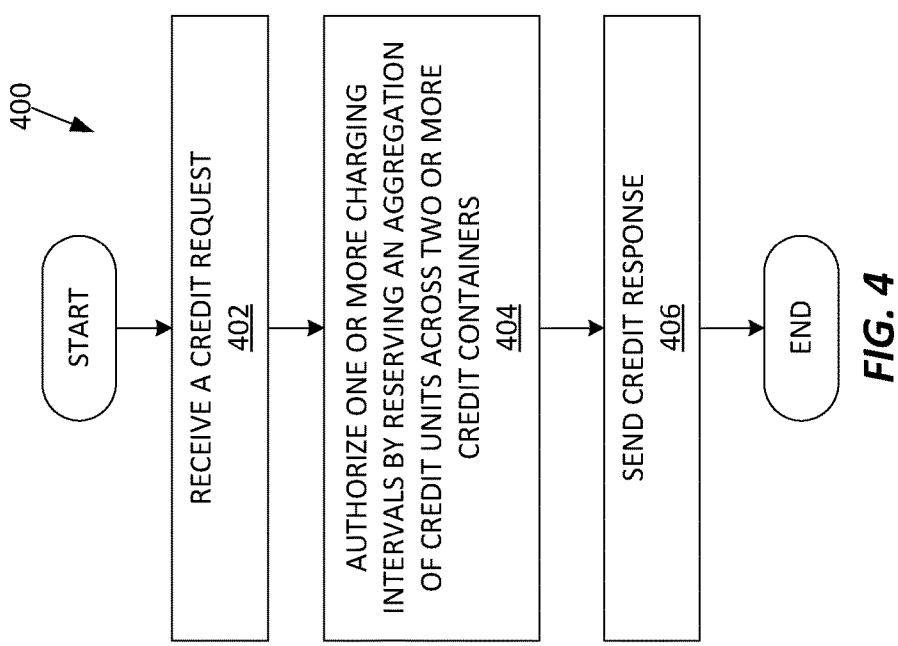
FIG. 4 is a logic flow diagram of one embodiment of a method of operation by a node of a charging system.

FIG. 4 illustrates a method 400 of operation by a charging system node, such as the charging system node 30 depicted in FIG. 1, which may be operative as the RF 74 and/or CIF 76 depicted in FIG. 2. Performance of the method 400 may be on a repeating or triggered basis, responsive to individual credit requests incoming from one or more CTFs 60 for chargeable events occurring in the communication network 10 for individual user devices 12. Processing captured in the illustrative flow corresponds to one such credit request.

The method 400 includes receiving (Block 402) a credit request for authorizing use of a communication service in the communication network 10 by a user device 12 associated with a user account 34. The credit request requests reservation of a first number of service units corresponding to one or more charging intervals, each charging interval defining, according to a charging configuration used in the communication network 10 for the communication service, a second number of service units, with each service unit being a quantum of metered consumption of the communication service.

The method 400 further includes authorizing (block 404) the one or more charging intervals in dependence on sufficient credit units being available for reservation among multiple credit containers 36 associated with the user account 34, including authorizing each of at least one of the one or more charging intervals by reserving a corresponding aggregation of credit units from two or more credit containers 36 among the multiple credit containers 36. Here, the respective number of credit units reserved from each of the two or more credit containers 36 for the aggregation of credit units depends on a type-dependent rating function that translates between the service units and the type of credit units contained in the credit container 36. In other words, at least one of the one or more whole charging intervals needed to provide the number of service intervals implicated in the credit request is rated (filled) using a mix of credit units from two or more credit containers 36. Of course, the charging system node 30 or other node performing the method 400 is also operative to fill one or more charging intervals using credit units from a single credit container 36, at least in cases where the selected credit container 36 has sufficient credit.

Continuing, the method 400 further includes sending (Block 406) a credit response indicating a total number of service units corresponding to the authorized charging intervals. Here, the number of authorized charging intervals may be any number from zero up to the number needed to satisfy the credit request. Returning an indication of zero authorized charging intervals corresponds to circumstances where there was insufficient available credit across any and all credit containers 36 that were candidates for charging against the received credit request.

In at least one embodiment, the aggregation of credit units from the two or more credit containers 36 used to authorize a corresponding one of the one or more charging intervals being authorized comprises credit units of different types. Here, the type-dependent rating function used in the method 400 accounts for the type of credit unit in each credit container 36 involved in the aggregation of credit units.

The one or more charging intervals may be globally associated with the communication service, according to the charging configuration. That is, the network operator may define a desired or default size of the charging intervals used for respective communication services or types of communication services, with the size expressed in terms of the number of relevant service units contained within one charging interval. With the method 400 providing a mechanism for filling a given charging interval using essentially any mix of credit unit types taken from two or more credit containers 36, the method 400 preserves the desired or default charging interval size, while still allowing credit units to be reserved from credit containers 36 that do not contain sufficient credit for authorizing the entire charging interval.

As a non-limiting example, the type of credit units associated with each credit container 36 among the multiple credit containers 36 that are candidates for charging with respect to a particular credit request may be any one of a monetary amount, a time duration, or a unitless quantum of metered consumption of the communication service. The credit containers 36 that are candidates for charging with respect to any given credit request will generally depend on one or more of the involved user devices 12, the involved user account 34, and the involved communication service or type of communication service. Other factors may include the time, date, location of the user device 12, the roaming status of the user device 12, etc.

In at least one embodiment of the method 400, the multiple credit containers 36 that are used or considered for charging with respect to the received credit request are identified as being chargeable for the involved communication service, based on determining which communication service products and associated credit containers 36 are chargeable for use of the communication service. In an example case, the involved user account 34 includes or links to a number of credit containers 36, and configuration information available to the charging system node 30 or other node performing the method 400 indicates which ones of those credit containers 36 are chargeable for particular communication services or types of communication services. For example, a certain credit container 36 linked to a certain user account 34 may be chargeable for data-type communication sessions irrespective of the third parties involved in the sessions. Contrastingly, for business promotion or affiliation reasons, another credit container 36 linked to the user account 34 may be chargeable only with respect to communication sessions involving a particular third party or third parties.

Therefore, for any given incoming credit request, there may be no valid credit containers 36 available for charging, or there may be no valid credit containers 36 that in the aggregate contain sufficient credit to authorize the incoming credit request, or there may be one or more valid credit containers 36 that individually or collectively contain sufficient credit for authorizing the incoming credit request. In all cases, the charging system node 30 or other node performing the method 400 may be configured to identify any and all credit containers 36 that are candidates for charging with respect to any particular incoming credit request and proceed accordingly.

As emphasized throughout, one of the several advantages of the techniques disclosed herein is that a charging interval of a fixed or defined size may be filled based on reserving and aggregation of credit units from across two or more credit containers 36, even when the respective credit containers 36 contain different types of credit units. In an example case, the incoming credit request represents a number of service units to be authorized for the involved communication service, and the charging system node 30 or other node performing the method 400 will attempt to authorize as many whole charging intervals as are needed to satisfy the credit request, although the availability of credit will determine whether any or how many charging intervals are authorized.

Assume a credit request incoming to the charging system node 30 or other node performing the method 400 requests authorization for a first number of service units. Further, assume that the defined charging interval for the involved communication service contains a second number of service units. If the first number of service units is less than the second number of service units, then only one whole charging interval need be authorized. More generally, authorizing the requested number of service units requires as many whole charging intervals as are needed to meet the requested number. Finally, assume that the availability of credit in the multiple credit containers 36 that are candidates for charging with respect to the credit request is such that at least one of the charging intervals to be authorized will be authorized using a corresponding aggregation of credit units from two or more of the multiple credit containers 36. In an example implementation, reserving the corresponding aggregation of credit units comprises, for example, reserving a number of credit units from a currently-selected one of the multiple credit containers 36, for authorizing a first fraction of the second number of service units defined by charging interval, and reserving a number of credit units from a next-selected one of the multiple credit containers 36, for authorizing a second fraction of the second number of service units defined by the charging interval.

The number of credit units reserved from the currently-selected credit container 36 may be a remaining number of credit units in the currently-selected credit container, such that the aggregated reservation exhausts the currently-selected credit container. Correspondingly, the method 400 in such embodiments includes determining the first and second fractions of the second number of service units defined by the charging interval according to the type-dependent rating function as applied respectively to the currently-selected and next-selected credit containers. That is, the charging system node 30 or other node performing the method 400 determines how many service units for the open charging interval can be rated using the available credit remaining in the currently-selected credit container 36 according to the credit-unit-to-service-unit conversion defined by the applicable rating function, and does likewise for one or more next-selected credit containers 36 until the open charging interval is filled or until it is determined that there is insufficient credit to fill the open charging interval.

The currently-selected and next-selected credit containers 36 may be regarded as first and second credit containers 36 that have differing selection priorities. In such embodiments, the method 400 includes selecting, as the currently-selected credit container, the first credit container in preference to the second credit container, in response to determining that the first credit container has a higher selection priority than the second credit container. The container priorities are determined, for example, from configuration information stored or received by the charging system node 30 or other node that performs the method 400.

For each charging interval that is authorized by reserving a corresponding aggregation of credit units from two or more credit containers 36, reserving corresponding credit units from each of the two or more credit containers 36 comprises applying the type-based rating function to the credit units in each credit container 36, using rating data to determine a per service unit of cost expressed in the unit of measure used by the credit units being rated. "Rating data" refers to information configured in or received at the node performing the method 400, where such information defines the conversion or translation between the service units being rated and the credit units being reserved or consumed for the rating. As noted, the type-based rating function may also be a container-based rating function, such that different ratings are applied in dependence on which credit container 36 the credit units being rated belong to, and in dependence on the type of the credit units being rated.

Figure 5:
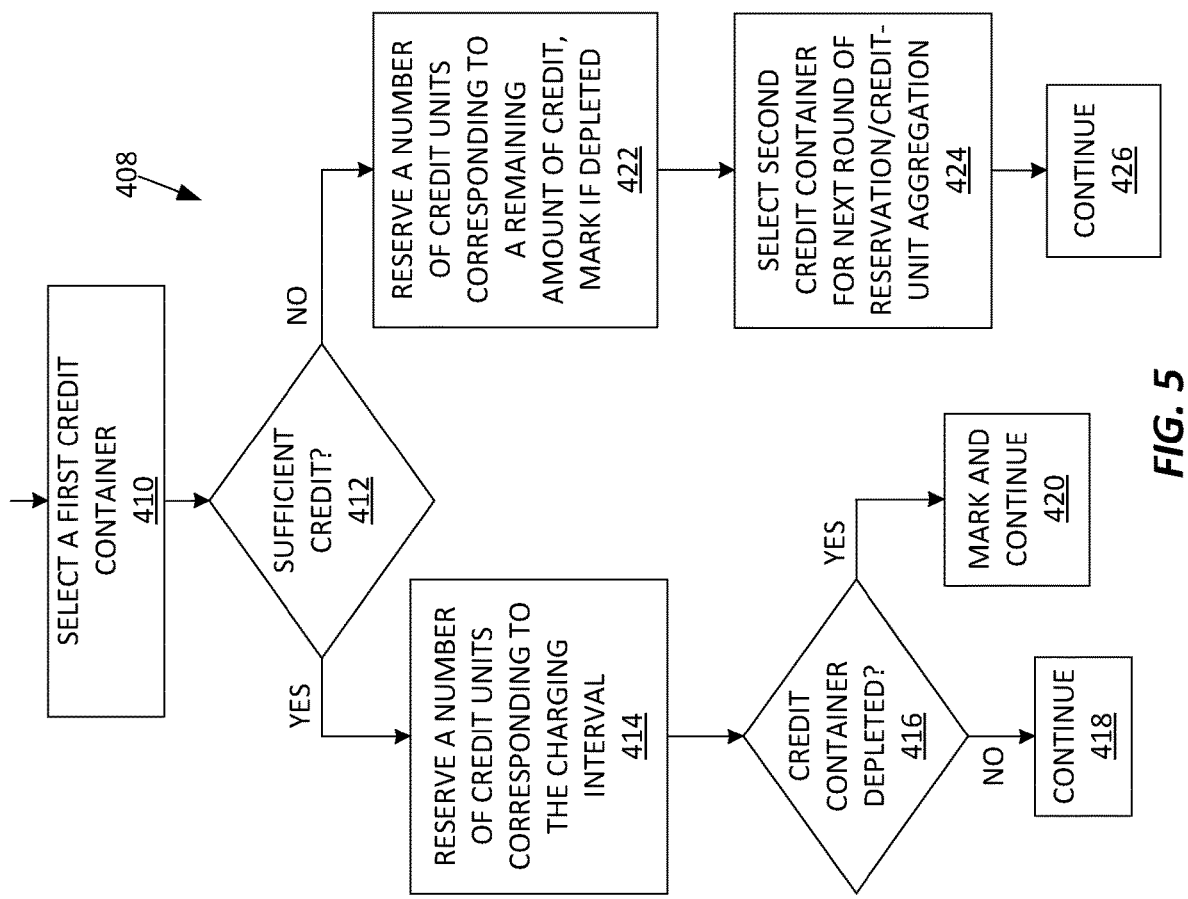
FIG. 5 is a logic flow diagram of example implementation details for the method illustrated in FIG. 4.

FIG. 5 illustrates a method 408, as performed by the charging system node 30 or by another node, with the method 408 representing example details regarding the aggregation of credit units in the context of Block 404 in the method 400. The method 408, therefore, stands as an example of authorizing/filling a given charging interval, using credit units from more than one credit container 36. While the method 408 presumes that the given charging interval to be filled is a newly opened charging interval—i.e., one for which no service units have yet been filled, it will be appreciated that the method 408 also may be used to fill any remaining unfilled portion of an already-opened charging interval.

A charging interval is "open" when it is selected for authorization or otherwise in the process of being authorized. And, again, authorizing an open charging interval means filling the charging interval with rated service units using available credit in or linked to the involved user account 34. In that sense, before being authorized, a charging interval can be regarded as a placeholder for a defined number of service units to be rated, whereas an authorized charging interval can be regarded as a container or data structure holding the defined number of rated service units.

Turning to the process flow details, the method 408 includes selecting (Block 410) a first credit container 36. Here, the "selection" operation may involve selecting an initial or next one among multiple credit containers 36 that are candidates for charging or may involve continuing use of a currently-selected credit container 36 that contains remaining credit. If the first credit container 36 contains sufficient credit for authorizing the whole charging interval, (YES from Block 412), the method 408 continues with reserving (Block 414) a number of credit units from the first credit container 36 corresponding to the charging interval—here, "corresponding to the charging interval" means the number of credit units needed to rate/authorize the number of service units in the charging interval left to rate/authorize.

If the operations in Block 414 do not deplete the first credit container 36 (NO from Block 416), the node performing the method 408 continues with further operations (Block 418), which depend on whether there are any further charging intervals to be authorized. If the operations in Block 414 deplete (YES from Block 416) the first credit container 36, the node logically marks (Block 420) the first credit container 36 as being depleted, to avoid reselecting it, at least within the temporal context of the method 408.

On the other hand, if the first credit container 36 does not contain sufficient credit for authorizing the whole charging interval (NO from Block 412), the method 408 attempts to authorize the charging interval using a corresponding aggregation of credit units from two or more of the credit containers 36 that are candidates for charging with respect to the credit request being processed. These operations include reserving (Block 422) a number of credit units corresponding to a remaining amount of credit in the selected first credit container 36. Here, "reserving a remaining amount of credit" does not necessarily mean reserving every last credit unit remaining in the credit container 36. Instead, "reserving a remaining amount of credit" means reserving the allocable portion of those credit units remaining in the credit container 36. As a specific example, if the credit container 36 contains bonus points and the rating data indicates that two bonus points per service units are required, then only an even number of remaining bonus points in the credit container 36 are reserved. If the reservation depletes the credit container 36, it is so marked.

Processing continues with selecting (Block 424) a second credit container for a next round of reservation in the credit unit aggregation processing, and processing continues (Block 426) from there. The details of such further processing depend on whether the second credit container 36 included sufficient credit to fill the charging interval and whether there are any remaining charging intervals to fill.

Figure 6:
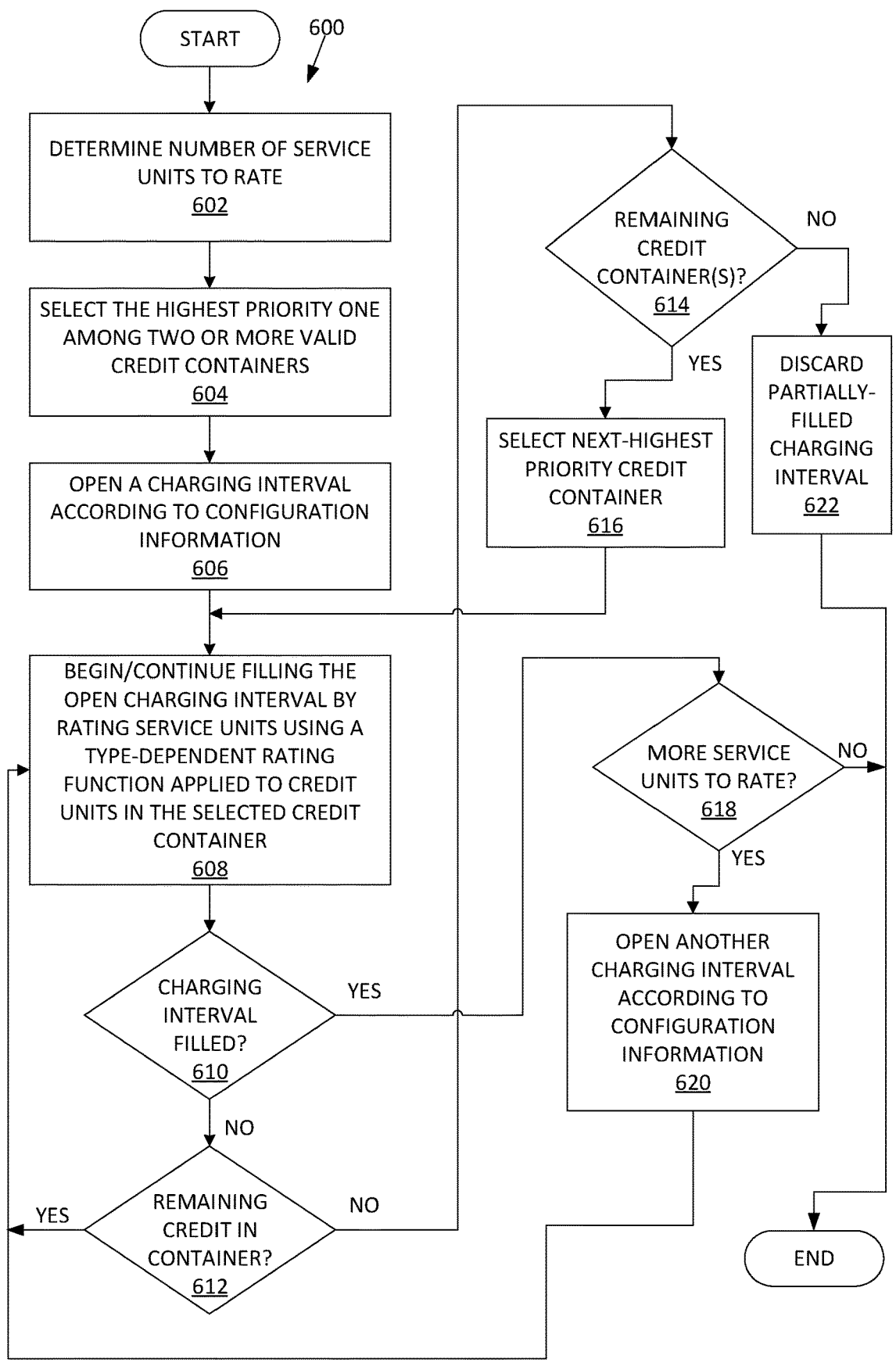
FIG. 6 is a logic flow diagram of example details for authorizing a requested number of service units, with respect to multiple credit containers.

FIG. 6 illustrates another example method performed by a charging system node 30 or by another node within the charging system 20, where the illustrated operations may be regarded as representing a more detailed embodiment of the method 400 depicted in FIG. 4.

The method 600 assumes receipt of a credit request that requests rating for a number of service units for a corresponding communication service to be consumed by a user device 12 that is associated with a user account 34. The method 600 includes determining (Block 602) the number of service units to rate, which may be understood as determining how many whole charging intervals are needed to satisfy the request.

Assuming that there are multiple—two or more—valid credit containers 36 that are candidates for charging with respect to the credit request, the method 600 includes selecting (Block 604) a highest priority one among the two or more valid credit containers 36, and opening (Block 606) a charging interval according to stored or received configuration information. As noted, opening a charging interval means beginning or continuing an attempt to rate a defined number of service units, where the number of service units to be rated is defined by the size of the charging interval.

The method 600 includes beginning/continuing (Block 608) to fill the open charging interval by rating service units using a type-dependent rating function applied to credit units in the selected credit container 36. As long as there are service units left to rate for filling the open charging interval (NO from Block 610) and usable credit remains in the currently-selected credit container 36 (YES from Block 612), filling continues for the open charging interval. If there are service units left to rate for the open charging interval (NO from Block 610) but insufficient credit remains in the currently-selected credit container 36 (NO from Block 612), the method 600 continues with determining whether there are any remaining credit containers 36 that are candidates for charging. If so (YES from Block 614), processing continues with selecting (Block 616) the next-highest priority one among the remaining candidate credit containers 36 and returning to the filling loop defined by Blocks 608, 610, and 612.

A similar looping continues if there are more service units to rate after filling the charging interval (YES from Block 618). That is, after filling the current charging interval and with more service units to rate, the method 600 continues with opening (Block 620) another charging interval according to the applicable configuration information and returning to the filling loop defined by Blocks 608, 610, and 612.

If there are no remaining credit containers 36 to use for filling the currently-open charging interval (NO from Block 614), the method 600 continues with discarding (Block 622) the partially-filled charging interval, as only whole charging intervals are granted/authorized. The corresponding credit response returned in reply to the credit request indicates the number of service units that were authorized.

Blocks 606 and 620 in the depicted processing flow referred to opening charging intervals according to configuration information. As explained before, one of the advantages of the techniques disclosed herein is that the size of the charging interval need not be dynamically adapted to "fit" the remaining credit available within a given single credit container 36. Instead, the charging interval size may be defined according to business or technical needs and it should be understood that the charging interval size for a given communication service may be defined globally within the communication network 10. Additionally, or alternatively, there may be charging interval sizes defined specifically for the involved communication products—i.e., purchased amounts of particular communication services. In this sense, a given credit container 36 may be referred to as a "product bucket", to denote the fact that the credit container 36 contains credit for reservation/charging against a particular product offering for one or more communication services or types of communication services made available through the communication network 10.

Figure 7:
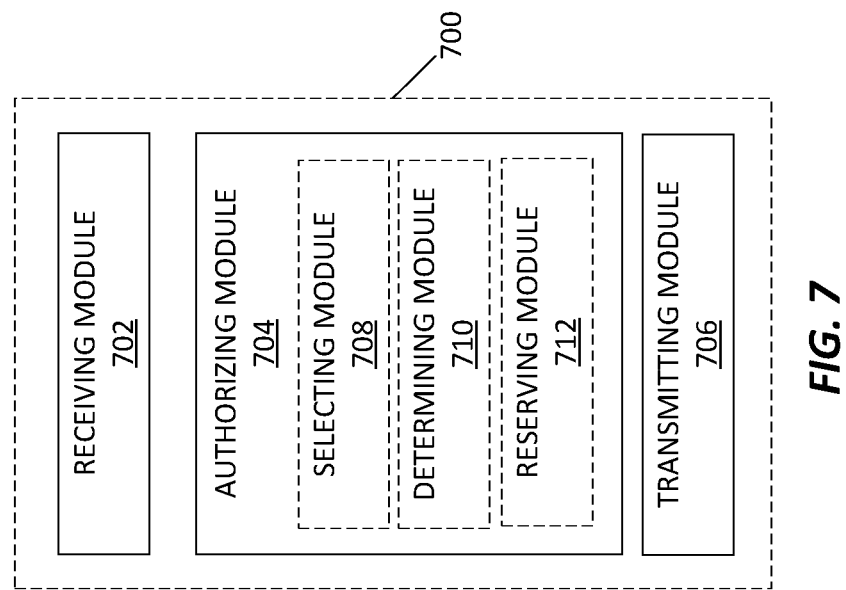
FIG. 7 is a block diagram of another embodiment of a charging system node.

FIG. 7 illustrates another example embodiment of the charging system node 30 introduced in FIG. 1. According to the depiction, the charging system node 30 comprises a collection 700 of functional modules or computing units, including a receiving module 702, an authorizing module 704, and a transmitting module 706.

The receiving module 702 is configured to receive a credit request for authorizing use of a communication service in the communication network 10 by a user device 12 associated with a user account 34. The credit request requests reservation of a first number of service units corresponding to one or more charging intervals, each charging interval defining, according to a charging configuration used in the communication network 10 for the communication service, a second number of service units. Each service unit represents a quantum of metered consumption of the communication service.

The authorizing module 704 is configured to authorize the one or more charging intervals in dependence on sufficient credit units being available for reservation among multiple credit containers 36 associated with the user account, including authorizing each of at least one of the one or more charging intervals by reserving a corresponding aggregation of credit units from two or more credit containers 36 among the multiple credit containers 36. The respective number of credit units reserved from each of the two or more credit containers 36 for the corresponding aggregation of credit units depends on a type-dependent rating function that translates between the service units and the type of credit units contained in the credit container 36.

In at least one implementation, the authorizing module 704 includes a selecting module 708, a determining module 710, and a reserving module 712. The selecting module 708 is configured to select credit containers 36 according to configured priority information; the determining module 710 is configured to determine the number of credit units needed from the currently-selected credit container 36 for rating respective ones of the service units in the currently-open charging interval being filled; and the reserving module 712 is configured to reserve the credit units "consumed" by the rating operations.

The transmitting module 706 is configured to send a credit response indicating a total number of service units corresponding to the authorized charging intervals.

All of the above-described modules may be understood as functional circuits implemented via underlying processing and communication circuitry, irrespective of whether the modules are realized in a virtualized processing environment. In one example, the functional implementation arises from the execution of computer program instructions stored in one or more computer programs by corresponding microprocessor-based circuitry.

With all of the above examples in mind, consider the following step-by-step example where a credit request for authorizing a voice service implicates three credit containers 36-1, 36-2, and 36-3, with the first credit container 36-1 containing bonus points, the second credit container 36-2 containing free minutes, and the third credit container 36-3 containing U.S. Dollars. Service units for the voice service are expressed as whole minutes and the type-based rating function sets the following "costs" or "prices" for the service units to be rated: two bonus points per minute of voice service, one free minute per minute of voice service, and $0.4 per minute of voice service.

Assume that the available credit in the first credit container 36-1 and in the second credit container 36-2 is not sufficient to fill a whole charging interval as defined for the voice service. Further, assume that the selection preferences or priorities are as follows: consumption of bonus points from the credit container 36-1 is preferred over the consumption of free minutes from the credit container 36-2, and the consumption of free minutes from the credit container 36-2 is preferred over the consumption of money from the credit container 36-3. On those assumptions, the techniques disclosed herein fill a first part of the charging interval using bonus points, a second part of the charging interval using free minutes, and a remaining part of the charging interval using money. The defined size of the charging interval is preserved via the aggregation of different types of credit units from different credit containers 36, while avoiding repeated unnecessary interrogations towards credit containers 36 that are exhausted.

While the foregoing example illustrates certain advantages and demonstrates the flexibility of the contemplated techniques, it is non-limiting in terms of the number of credit containers 36 that are involved, the type of communication service involved, and the types or kinds of credit units involved.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation performed by a charging system node of a charging system associated with a communication network, the method comprising:
   receiving a credit request for authorizing use of a communication service in the communication network by a user device associated with a user account, the credit request requesting reservation of a first number of service units corresponding to one or more charging intervals, each charging interval defining, according to a charging configuration used in the communication network for the communication service, a second number of service units, with each service unit being a quantum of metered consumption of the communication service;
   authorizing the one or more charging intervals in dependence on sufficient credit units being available for reservation among multiple credit containers associated with the user account, including authorizing each of at least one of the one or more charging intervals by reserving a corresponding aggregation of credit units from two or more credit containers among the multiple credit containers, wherein a respective number of credit units reserved from each of the two or more credit containers for the corresponding aggregation of credit units depends on a type-dependent rating function that translates between the service units and the type of credit units contained in the credit container; and
   sending a credit response indicating a total number of service units corresponding to the authorized charging intervals.

2. The method according to claim 1, wherein the aggregation of credit units from the two or more credit containers comprises credit units of different types and wherein the type-dependent rating function accounts for the type of credit unit in each credit container involved in the aggregation of credit units.

3. The method according to claim 1, further comprising identifying the multiple credit containers as being chargeable for the communication service based on determining which communication service products and associated credit containers are chargeable for use of the communication service.

4. The method according to claim 1, wherein authorizing each of at least one of the one or more charging intervals by reserving the corresponding aggregation of credit units from two or more credit containers among the multiple credit containers comprises reserving a number of credit units from a currently-selected one of the multiple credit containers, for authorizing a first fraction of the second number of service units defined by charging interval, and reserving a number of credit units from a next-selected one of the multiple credit containers, for authorizing a second fraction of the second number of service units defined by the charging interval.

5. The method according to claim 4, wherein the number of credit units reserved from the currently-selected credit container is a remaining number of credit units in the currently-selected credit container, such that the corresponding aggregated reservation exhausts the currently-selected credit container, and wherein the method includes determining the first and second fractions of the second number of service units defined by the charging interval according to the type-dependent rating function as applied respectively to the currently-selected and next-selected credit containers.

6. The method according to claim 4, wherein the currently-selected and next-selected credit containers are first and second credit containers have differing selection priorities and wherein the method includes selecting, as the currently-selected credit container, the first credit container in preference to the second credit container, in response to determining that the first credit container has a higher selection priority than the second credit container.

7. The method according to claim 6, wherein the priorities are determined from configuration information stored or received by the charging system node of the charging system.

8. The method according to claim 1, wherein, for each of the at least one charging interval that is authorized by reserving the corresponding aggregation of credit units from two or more credit containers among the multiple credit containers, reserving corresponding credit units from each of the two or more credit containers comprises applying the type-based rating function to the credit units in each credit container, using rating data to determine a per service unit of cost expressed in the unit of measure used by the credit units being rated.

9. The method according to claim 8, wherein the type-based rating function is also a container-based rating function, such that different ratings are applied in dependence on which credit container the credit units being rated belong to, and in dependence on the type of the credit units being rated.

10. A charging system node configured for operation in a charging system associated with a communication network, the charging system node comprising:
communication interface circuitry configured to send messages to and receive messages from one or more other nodes in the charging system or the communication network; and
processing circuitry operatively associated with the communication interface circuitry and configured to:
receive a credit request for authorizing use of a communication service in the communication network by a user device associated with a user account, the credit request requesting reservation of a first number of service units corresponding to one or more charging intervals, each charging interval defining, according to a charging configuration used in the communication network for the communication service, a second number of service units, with each service unit being a quantum of metered consumption of the communication service;
authorize the one or more charging intervals in dependence on sufficient credit units being available for reservation among multiple credit containers associated with the user account, including authorizing each of at least one of the one or more charging intervals by reserving a corresponding aggregation of credit units from two or more credit containers among the multiple credit containers, wherein a respective number of credit units reserved from each of the two or more credit containers for the corresponding aggregation of credit units depends on a type-dependent rating function that translates between the service units and the type of credit units contained in the credit container; and
send a credit response indicating a total number of service units corresponding to the authorized charging intervals.

11. The charging system node according to claim 10, wherein the aggregation of credit units from the two or more credit containers comprises credit units of different types and wherein the type-dependent rating function accounts for the type of credit unit in each credit container involved in the aggregation of credit units.

12. The charging system node according to claim 10, wherein the one or more charging intervals are globally associated with the communication service, according to the charging configuration.

13. The charging system node according to claim 10, wherein the type of credit units associated with each credit container among the multiple credit containers may be any one of a monetary amount, a time duration, or a unitless quantum of metered consumption of the communication service.

14. The charging system node according to claim 10, wherein the processing circuitry is configured to identify the multiple credit containers as being chargeable for the communication service, based on determining which communication service products and associated credit containers are chargeable for use of the communication service.

15. The charging system node according to claim 10, wherein, for authorizing each of at least one of the one or more charging intervals by reserving the corresponding aggregation of credit units from two or more credit containers among the multiple credit containers, the processing circuitry is configured to reserve a number of credit units from a currently-selected one of the multiple credit containers, for authorizing a first fraction of the second number of service units defined by charging interval, and reserve a number of credit units from a next-selected one of the multiple credit containers, for authorizing a second fraction of the second number of service units defined by the charging interval.

16. The charging system node according to claim 15, wherein the number of credit units reserved from the currently-selected credit container is a remaining number of credit units in the currently-selected credit container, such that the aggregated reservation exhausts the currently-selected credit container, and wherein the processing circuitry is configured to determine the first and second fractions of the second number of service units defined by the charging interval according to the type-dependent rating function as applied respectively to the currently-selected and next-selected credit containers.

17. The charging system node according to claim 15, wherein the currently-selected and next-selected credit containers are first and second credit containers have differing selection priorities and wherein the processing circuitry is configured to select, as the currently-selected credit container, the first credit container in preference to the second credit container, in response to determining that the first credit container has a higher selection priority than the second credit container.

18. The charging system node according to claim 17, wherein the processing circuitry is configured to determine the priorities from configuration information stored or received by the charging system node.

19. The charging system node according to claim 10, wherein, for each of the at least one charging interval that is authorized by reserving the corresponding aggregation of credit units from two or more credit containers among the multiple credit containers, the processing circuitry is configured to reserve corresponding credit units from each of the two or more credit containers by applying the type-based rating function to the credit units in each credit container, using rating data to determine a per service unit of cost expressed in the unit of measure used by the credit units being rated.

20. The charging system node according to claim 19, wherein the type-based rating function is also a container-based rating function, such that different ratings are applied in dependence on which credit container the credit units being rated belong to, and in dependence on the type of the credit units being rated.

* * * * *